No. 817,470. PATENTED APR. 10, 1906.
J. A. & E. S. COLE.
PITOT TUBE CONNECTION.
APPLICATION FILED MAR. 15, 1905.
2 SHEETS—SHEET 1.
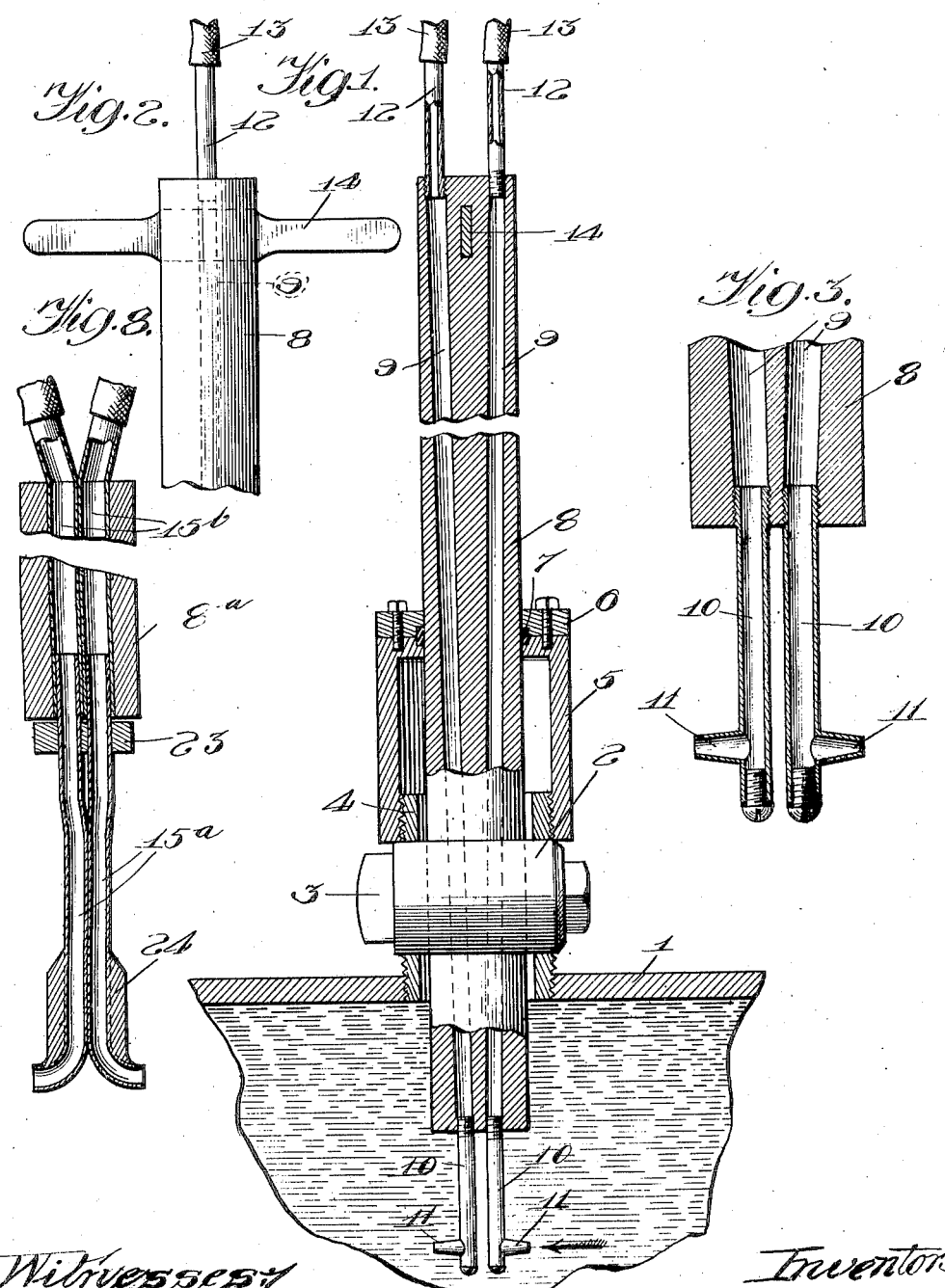

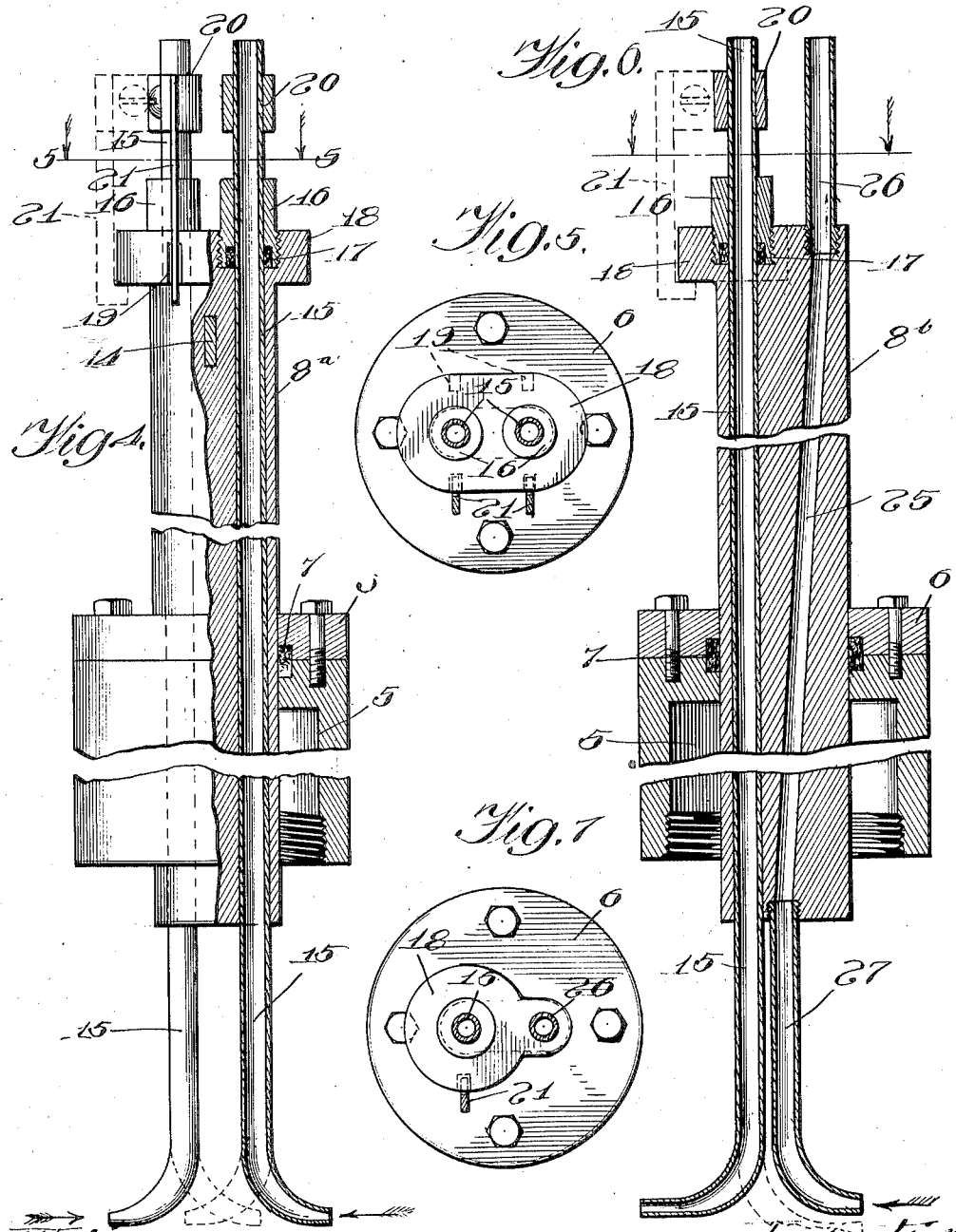

UNITED STATES PATENT OFFICE.

JOHN A. COLE, OF CHICAGO, ILLINOIS, AND EDWARD S. COLE, OF UPPER MONTCLAIR, NEW JERSEY.

PITOT-TUBE CONNECTION.

No. 817,470.   Specification of Letters Patent.   Patented April 10, 1906.

Application filed March 15, 1905. Serial No. 250,314.

*To all whom it may concern:*

Be it known that we, JOHN A. COLE, residing at Chicago, in the county of Cook and State of Illinois, and EDWARD S. COLE, residing at Upper Montclair, in the county of Essex and State of New Jersey, citizens of the United States, have invented a certain new and useful Improvement in Pitot-Tube Connections, of which the following is a full, clear, concise, and exact description, reference being had to the accompanying drawings, forming a part of this specification.

Our invention relates to Pitot-tube constructions—that is to say, to devices embodying a pair of conduits or ducts adapted for use in connection with a main or pipe containing a flowing stream, so that the velocity and static pressure of said stream can be ascertained through the two ducts or conduits.

A usual arrangement of Pitot's tubes is to have two separate tubes provided with suitable connecting members for connecting said tubes together. These tubes are long tubes of small bore and have their lower ends bent, so that when in the main or pipe one end extends upstream and the other downstream. The two tubes are introduced into the main or pipe through a tap or other device in connection therewith. When so introduced and in use, the movement of the flowing stream in the pipe or main tends to bend or twist the tubes so as to turn their bent ends in a sidewise or downward manner, and thereby render the meter readings inaccurate.

The object of our invention is to provide a simple, practical and inexpensive construction for preventing such an undesirable result.

In accordance with our invention we provide a rigid holder for the usual pitot-tube orifices, by which the latter can be held securely in position, and employ this for the pitot-tube arrangement. This rigid structure could be employed by providing it with a couple of longitudinal perforations which will form the two desired ducts or conduits, or we can employ the structure as a holder or container for one or two small-bore tubes which can be inserted and extended through such structure. In either case the bar or rod or rigid structure, whatever form the same may take, renders twisting or bending or other undesirable movement on the part of the tubes or tube arrangement impossible, so that strict rigidity is secured notwithstanding the velocity of the flowing stream and the size of the main or pipe through which the same is flowing, and accuracy of result in the meter is thereby secured.

In the accompanying drawings, Figure 1 is a longitudinal section of a portion of a street-main with a Pitot-tube arrangement embodying our invention attached thereto. Fig. 2 is a view of the upper portion of such connection. Fig. 3 is a longitudinal section of the lower portion thereof on an enlarged scale. Fig. 4 is a view, partly in elevation and partly in longitudinal section, of a modified form of Pitot-tube arrangement. Fig. 5 is a section taken on line 5 5 in Fig. 4. Figs. 6 and 7 are similar views of a still different modification, and Fig. 8 is a view of a modified arrangement of the form shown in Figs. 4 and 5.

Referring to the drawings, 1 is a main or pipe located any place—as, for example, in the street of a city—through which pipe a flowing stream of water is understood to be passing, the pipe being part of the city-water system. The pipe is shown provided with a plug or tap 2, provided with a valve 3, and having a screw-threaded upper end 4. A sleeve or bushing 5 having a threaded end is adapted to fit upon the threaded end 4 of the plug 2. This sleeve is desirably provided with a disk or washer 6, containing between itself and the sleeve 5 a packing-ring 7 for affording a water-tight connection. Within the sleeve 6 is arranged an oval bar or rod 8, which is arranged to extend and pass through the sleeve 5 and plug 2 and into the water-main 1. This bar or rod 8 is of sufficient length to extend well into the interior of large mains. It is provided with two passages or ducts 9 9, which extend from end to end of said bar and are desirably made inclined with their upper or outer ends farthest from one another and their inner ends nearest together, so that it may be said that they converge inwardly—that is, toward the water-main. The lower end of the bar or rod 8 is provided with a pair of short tubes 10 10, having bent ends 11 11, said tubes 10 10 being conveniently screw-threaded into the ends of the ducts or passages 9 9. The upper end of the bar 8 is provided with a pair of tubes 12 12, conveniently screw-threaded into the upper ends of the passages 9 9 and adapted to connect with flexible tubular connections 13 13, which are understood t run to the meter, which may be of any suitable or desired construction. The upper portion of the bar 8 is provided with a transverse socket, in which a rod 14 can be fitted, by which arrangement the bar 8 can be turned or raised or lowered. By such arrangement it will be seen that the meter connection can be applied to a water pipe or main by first attaching the sleeve 5 to the plug 2 with the valve 3 of the latter closed. The valve 3 can then be opened and the bar or rod 8 forced down, so that its lower end portion enters the main. This movement is desirably continued until the bent ends 11 11 of the tubes 10 10 are at substantially the middle of the main. The velocity of the flowing stream in the main is then indicated upon the meter by means of the Pitot-tube arrangement formed by the bar 8 and connections. The lower tube-sections 11 11 will be held in absolutely rigid and proper position, and their bent ends maintained always in a direct up and down stream line. When the reading is over, the bar 8 can be withdrawn, so as to bring its lower end with the tube-sections 10 10 into the bushing 5, after which the valve 3 can be closed and then the bushing 5 unscrewed and the connection removed.

By making the passages 9 9 converge connection can be readily made with the upper ends of the passages 9 9, and at the same time the lower ends can be brought so close together that the outwardly-bent ends of the tube-sections 10 10 can be prevented from projecting laterally beyond the bar 8, so that this bar can be readily raised and lowered and the tube-sections 10 10 and ends 11 11 withdrawn through the same aperture through which the bar is passed.

In the arrangement shown in Figs. 4 and 5 a rigid structure conveniently in the form of a rod or barrel or float $8^a$ is employed and is provided with two longitudinally-extending bores in which are arranged a pair of tubes 15 15, as shown in said figures. The lower ends of these tubes are bent laterally and desirably contracted at their outer ends. A pair of bushings 16 16 are conveniently fitted into the upper ends of the barrel or rod $8^a$ and provided with packing 17 17 to form a water-tight joint. The upper portion of the barrel is desirably provided with a peripheral enlargement or projection 18, having slots 19 19, and the upper ends of the tubes 15 15 are provided with collars 20 20, having downwardly-extending clips 21 21, whose lower ends extend below the lower edge of the annular enlargement 18 and are bent inwardly, as shown in dotted lines in the upper portion of Fig. 4. Thus engagement between the tubes 15 15 and the rod or tube $8^a$ to prevent rotation of the tubes within said rod or barrel is brought about by elevating the tube slightly, so as to draw the bent ends of the clips 21 21 up into the slots 19 19. In this arrangement also a cross-bar 14 is provided and a stuffing-box arrangement by which the device can be attached to a main or pipe. By such construction it will be seen that the tubes 15 15 can be inserted in the rod 8 8, the tubes being of such length that their lower ends project somewhat from the lower end of the rod or barrel. The tubes are then turned so that their bent ends point inwardly, as shown in dotted lines in Fig. 4, and then the rod is pushed through the stuffing-box and into the pipe or main. After it is in such position the tubes are turned by means of the collars 20 20 or other means until the bent ends of the tubes assume their proper positions, the one upstream and the other downstream. This can be ascertained by the position of the clips 21 21, for these clips are attached so as to be at right angles to the bent ends of the tubes 15 15. The tubes are then drawn up slightly, so that the lower ends of the clips 21 21 enter the slots 19 19, and thus lock the tubes in their proper positions.

In Fig. 8 is shown a modified construction of this form of device. The difference consists in making the projecting ends of the tubes separate from that portion thereof which lies within the tube or barrel $8^a$. For this there are shown a pair of detachable tube-sections $15^a$ $15^a$, adapted to fit or telescope within the tubes $15^b$ $15^b$ in the barrel $8^a$. A collar 23, having a tight driving fit on the tube-sections $15^a$ $15^a$, is provided, and a sleeve 24 is fitted to the lower ends of said tube-sections. These detachable tube-sections can thus be applied or removed from the barrel $8^a$, as desired.

In the arrangement shown in Figs. 5 and 6 we provide a barrel or rod $8^b$, having two longitudinal bores, one of which contains a tube 15 and the other of which, 25, serves itself as one of the desired passages or ducts. The tube 15 is provided with a stuffing-box, as described in connection with the device of Figs. 4 and 5. A tube-section 26 is fitted to the upper end of the barrel $8^b$, so as to communicate with the barrel 25 thereof, and another tube-section 27 having a bent end is connected with the lower end of the barrel, so as to communicate with said bore.

Thus it will be seen that in all of the foregoing arrangements a rigid structure is provided to afford a rigid support for the orifices of the Pitot-tube construction. In all cases these orifices (shown in the form of laterally-extending ends or portions of tubes or tube-sections) will be rigidly and firmly held against movement of any kind by the flowing stream, and thus accurate results will be secured in the meter to which the device is connected.

It will be understood that changes and modifications can be made without departing from the spirit of the invention.

What we claim is—

1. A device of the class specified, comprising a rigid holder in the form of a bar or rod, a pair of tubes held by said holder and having laterally-extending portions which project from the holder and whose ends open in opposite directions so as to form oppositely-facing orifices.

2. A Pitot-tube connection, comprising a pair of tubes having their ends bent laterally to form orifices and a rigid holder therefor in the form of a bar or rod, the tubes being arranged to fold together when in one position, and to rotate to cause the orifices to point in opposite directions when in the other position.

3. A device of the class specified, comprising a rigid holder in the form of a bar or rod, and a pair of tubes extending through said holder and having their lower ends projecting from the lower end of the holder, the tubes being constructed with laterally-extending portions having outwardly-opening ends which provide oppositely-facing orifices.

4. A device of the class specified, comprising a rigid holder in the form of a bar or rod, a pair of tubes extending through said holder and having their lower ends projecting from the lower end of the holder, said tubes having laterally-extending portions whose ends open outwardly to provide oppositely-facing orifices, said tubes being rotatable in the holder, and locking means for locking said tubes against rotation.

5. A Pitot-tube connection, comprising a rigid holder in the form of a bar or rod having longitudinally-extending bores or passages, a pair of tubes extended through said bores or passages, and having their lower ends bent laterally, the tubes being rotatable in said holder to permit their orifices to be turned so as to fold together in one position or to point in the opposite direction in another position.

6. A Pitot-tube connection comprising a bar or rod having longitudinally-extending bores or passages, a pair of tubes extended through said bores or passages, said tubes having their lower ends bent laterally, stuffing-boxes for said tubes, at the upper end of said bar or rod, a collar on said bar or rod and locking devices comprising clips on said tubes, having upturned ends and notches or slots in said collar.

In witness whereof we hereunto subscribe our names, the 7th and 11th days of March, A. D. 1905, respectively.

JOHN A. COLE.
EDWARD S. COLE.

Witnesses for John A. Cole:
A. M. BELFIELD,
I. C. LEE.

Witnesses for Edward S. Cole:
ANDREW S. FRASER,
T. C. PHILLIPS.